(12) United States Patent
Kliskey

(10) Patent No.: US 6,991,018 B2
(45) Date of Patent: Jan. 31, 2006

(54) PROTECTING PAD

(75) Inventor: Roger Kliskey, Brimfield, OH (US)

(73) Assignee: Summit Tool Company, Akron, OH (US)

( * ) Notice: Subject to any disclaimer, the term of this patent is extended or adjusted under 35 U.S.C. 154(b) by 38 days.

(21) Appl. No.: 10/456,617

(22) Filed: Jun. 6, 2003

(65) Prior Publication Data

US 2004/0244918 A1     Dec. 9, 2004

(51) Int. Cl.
*B60C 25/00*     (2006.01)

(52) U.S. Cl. .............................. 157/1; 157/1.1; 157/1.3

(58) Field of Classification Search .................. 157/1, 157/1.1, 1.3
See application file for complete search history.

(56) References Cited

U.S. PATENT DOCUMENTS

| | | | | |
|---|---|---|---|---|
| 2,923,346 A | * | 2/1960 | Twiford | 157/1 |
| 2,926,726 A | * | 3/1960 | Schultz | 157/1 |
| 3,493,028 A | * | 2/1970 | Strang et al. | 157/1 |
| 3,851,694 A | * | 12/1974 | Brosene, Jr. | 157/1 |

OTHER PUBLICATIONS

Sarveshwari Engineers, New Delhi, India Sarv Internet Product Sheet 1999.

* cited by examiner

*Primary Examiner*—Joseph J. Hail, III
*Assistant Examiner*—Anthony Ojini
(74) *Attorney, Agent, or Firm*—Renner, Kenner, Greive, Bobak, Taylor & Weber

(57) ABSTRACT

A protective pad which removably attaches to the rim of a wheel thereby protecting the wheel from damage during tire mounting and demounting when such mounting or demounting is performed manually using a tire working implement.

17 Claims, 3 Drawing Sheets

PROTECTING PAD

TECHNICAL FIELD

This invention relates generally to a flexible, resilient wheel protecting pad. More particularly, the present invention relates to a folded, crimped, wheel protecting pad having at least two planar sections, one of which is inserted between a tire and a wheel during tire mounting in order to protect the wheel and tire from damage by tire irons and other tire mounting tools.

BACKGROUND OF THE INVENTION

Pneumatic tires require repair or replacement from time to time because of sustained wear or damage. To effectuate such repair or replacement, it is generally required that the defective tire be removed from its associated wheel rim and a new or repaired tire may be mounted to the rim.

A variety of tools of varying configurations have been developed for providing a user with mechanical advantage in mounting or demounting a tire to a wheel rim. Such tools typically comprise an elongate bar having a handle at one end and an opposite working end adapted for insertion between the bead of a tire and its associated wheel rim. The working end of the tool frequently has a flattened or tapered portion to facilitate insertion of the working end between the tire bead and the wheel rim. The working ends of known tools are configured, in profile, as either straight, curved, or angled.

To utilize the demounting implement, the tool working portion is inserted manually by the user between the bead of the tire and its associate wheel rim. Thereafter, the user applies pressure on the handle, making a lever of the tool and utilizing the wheel rim as a fulcrum. Pressure upon the handle causes the tool to engage the tire bead and move a segment of the bead over the rim, thereby disengaging the bead segment from the rim. The tool is then redeployed along the tire to an adjacent location and the procedure is repeated upon a corresponding adjacent bead segment. Repeated redeployment and utilization of the tool about the periphery of the tire pulls a sufficient length of the tire bead over the rim until the tire is free for removal from the rim in its entirety. In more recent years, machines have been developed which rotate the tire in conjunction with the use of the tool to alleviate the need for moving the tool. However, mounting and demounting a tire to a commercial truck wheel is often performed manually.

Use of the wheel rim as a fulcrum about which to lever a tire tool provides an opportunity for the tool, typically made of iron or steel, to damage the finish of the wheel. Whether a wheel's surface is painted steel, finished aluminum, or other chrome-like surface, the result of repeated tool contact with the wheel is scratches, dents and abrasions to the wheel rim. A typical commercial truck wheel is expensive, and when one considers all of the wheels on an 18-wheeler semi-truck, the cost can get extremely expensive. Considering that commercial trucks may cover 100,000 miles or more per year, tires must be changed at least several times per year, with each change presenting an opportunity to damage the wheel. Damage to wheels, apart from being cosmetically undesirable, can have functional effects on the serviceability of both the wheel and the tire. Dents and abrasions to the wheel rim can be detrimental to the balance of a wheel, thereby causing the wheel to vibrate and possibly damaging the vehicle suspension or causing loss of vehicle control. The wheel rim is also the site where an airtight seal with the tire bead is and must be formed. Damage or abrasion to the wheel rim can prevent the formation of such an airtight seal with the tire bead. Worse still, if the wheel rim is sufficiently damaged or abraded; it can actually cut or puncture the tire bead, thereby rendering the tire dangerous and useless.

Certain known tire changing tools not only use the wheel rim as a fulcrum, but also contact the well of the wheel. Typically the well is painted or finished with a weather-resistant coating, intended to protect the underlying metal wheel from oxidation. Contact with a steel tire tool can abrade or scratch the finish, thereby exposing the metal to corrosion. Although not as immediately damaging to a wheel as physical bending or abrading of the rim, such resultant oxidative corrosion, if left unchecked, will lead to eventual rust-through of the wheel, rendering it useless and worthless.

Similar concerns exist for passenger automobile wheels. Traditionally, automobile wheels were fairly inexpensive, as they were made of steel. The use of hard metal implements for the mounting and demounting of tires was necessary yet caused little concern relative to damaging the steel wheels.

With the increasing use of light alloys, automobile wheels are now more susceptible to damage from hard metal implements used during the mounting and demounting of tires. The driving force behind the use of light alloy wheels in modern cars is the desire to improve traction and handling. Assuming that a car chassis is not modified, the rolling diameter of any tire/wheel combination installed on a car must remain constant. Wider and lower profile tires allow an increase in the size of the contact patch while maintaining a rolling diameter substantially the same as the manufacturer intended. A larger contact patch affords improved handling properties to the automobile. Such lower profile tires often have an increased speed rating relative to original equipment manufacturer's tires, and are often are available as aftermarket upgrades. In order to maintain a constant rolling diameter while improving handling properties, a tire having a lower profile must accompany a wheel having a correspondingly larger diameter.

Not long ago, 13- or 14-inch wheels wrapped in 65 or 75 series tires were the norm. Today, very few, if any, passenger cars are equipped with less than 15-inch wheels. Many cars now have tires with low profile sidewalls and diameters upwards of 25" standard, with 16-, 17- or even 18-inch diameter wheels standard. Wheel sizes up to 22-inches are available as aftermarket upgrades. As previously stated, these larger diameter tires having wider contact patches require larger diameter wheels to maintain a constant rolling diameter. Hence, aspect ratios of 55, 45, 35 and even 25 are now available. Light alloy wheels and the accompanying low profile, speed rated tires can get very expensive.

In light of the expense of wheels and tires for both commercial and passenger vehicles and their susceptibility to damage during mounting and demounting, the motivation to protect both tires and wheels during mounting and demounting on today's cars is readily apparent.

In the past, mechanics, both professionals and do-it-yourselfers, have developed home made solutions to the problem of wheel damage during tire mounting and demounting. A variety of imperfect solutions have been tried. Some have used heavy tape, such as duct tape or electrical tape to protect the rim of expensive alloy wheels from scratches incurred during tire mounting and demounting. Others have cut plastic beverage bottles into strips and wedged the strips into the gap between the wheel rim and tire bead to protect the wheel from damage. One more sophisticated attempt at protecting the wheel rim includes a hard plastic clip that slides over the rim edge and is provided with a rope to secure the clip in place. As a shop solution, many mechanics merely use a rag, another piece of cloth, or even a work glove. However, none of these items are specifically designed for the task at hand. None of these items are durable beyond a few uses. Moreover, these items are not readily fastened to the wheel rim in a secure manner that would allow the operator to devote his full attention to applying the careful attention and proper force required to mount or demount a tire to/from a wheel.

SUMMARY OF THE INVENTION

Until now, no one has made a pad specifically intended to protect not only the rim of commercial and passenger vehicle wheels, but also the wheel well, and which is flexible, resilient, and grips the wheel rim edge.

Broadly, the present invention relates to a lightweight, flexible, resilient protective pad which removably attaches to the rim of a wheel thereby protecting the wheel from damage during tire mounting and demounting when such mounting or demounting is performed with tire irons or the like.

The advantages of the present invention over the known art relating to wheel protecting pads, which shall become apparent from the description and drawings that follow, are accomplished by the invention as hereinafter described and claimed.

In general, one or more aspects of the present invention may be accomplished by a wheel protecting pad that includes a body, an attachment assembly that includes a foldover, a first crease, and a second crease, where the foldover defines an open bore adapted to receive the rim, wherein the body is attached to the attachment assembly and a flange attached to the attachment assembly opposite the body to receive the rim.

A further aspect of the present invention may be accomplished with a wheel protecting pad, for protecting a wheel having a rim and a tire from a tire implement during tire mounting and demounting, the pad including a flange insertable between the tire and the wheel made of a soft flexible resilient material, and an attachment assembly attached to said flange, and adapted to grip the rim of the wheel thereby providing a barrier between the wheel and a tire iron.

Yet another aspect of the present invention may be realized by a wheel protecting pad for protecting a wheel during mounting and demounting, that includes a piece of leather having a body, at least one foldover, and at least one flange, whereby a respective flange is attached to the body by a respective foldover, and wherein the body and the at least one flange are substantially planar and substantially parallel to one another, the foldover being adapted to urge the flange toward a configuration substantially parallel to the body.

DETAILED DESCRIPTION

The present invention is directed toward a wheel protecting pad, generally indicated by the numeral 10 in the accompanying drawings. In general, pad 10 includes a body 11 and an attachment assembly, generally indicated by the numeral 15.

Figure 5:
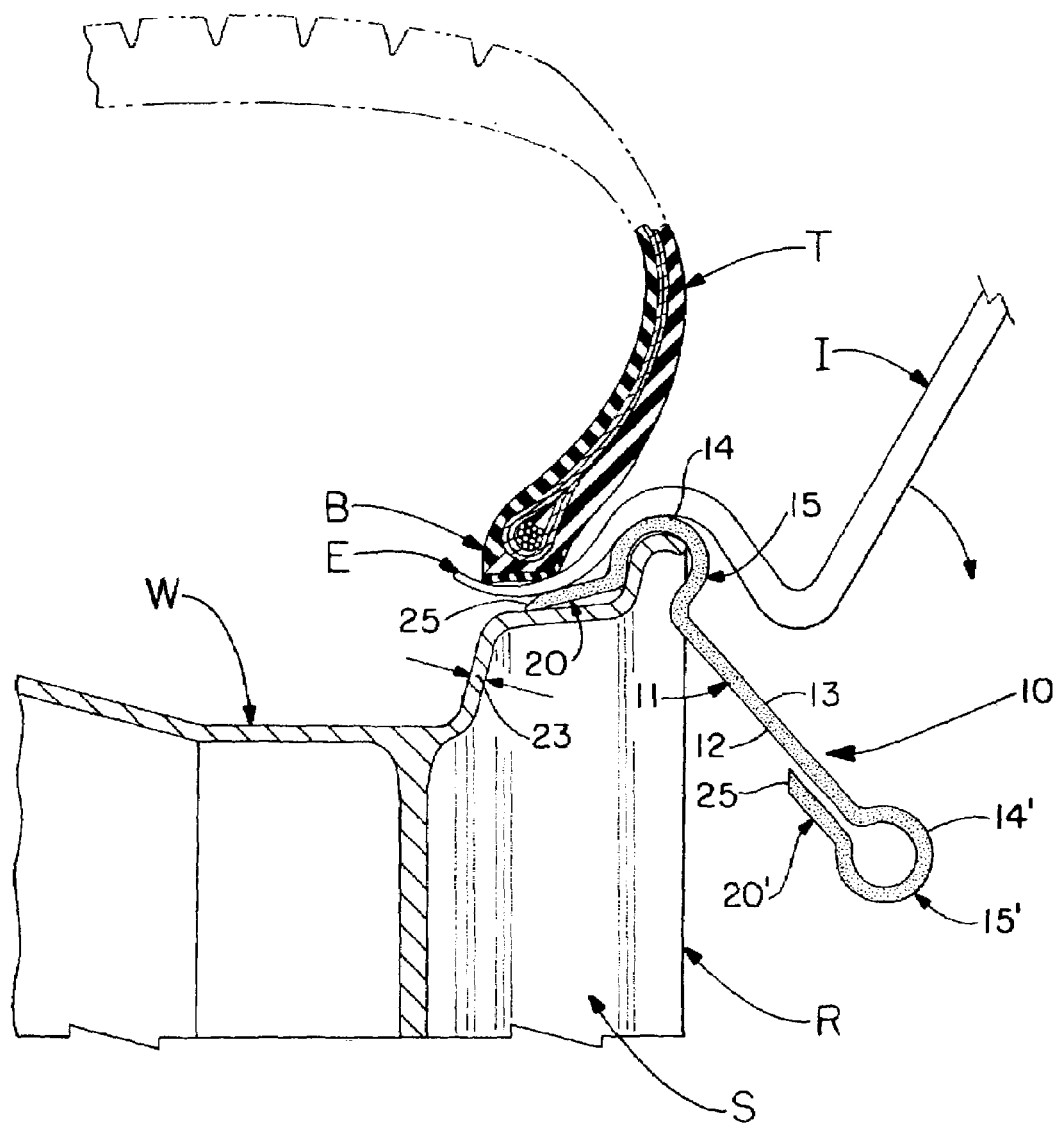
FIG. 5 is a fragmental partially sectioned side elevational view of a wheel and a tire depicting the protecting pad located on a rim of the wheel during the removal of the tire by a tire working implement, where the body of the pad is shown in an extended position for purposes of illustration.
Figure 6:
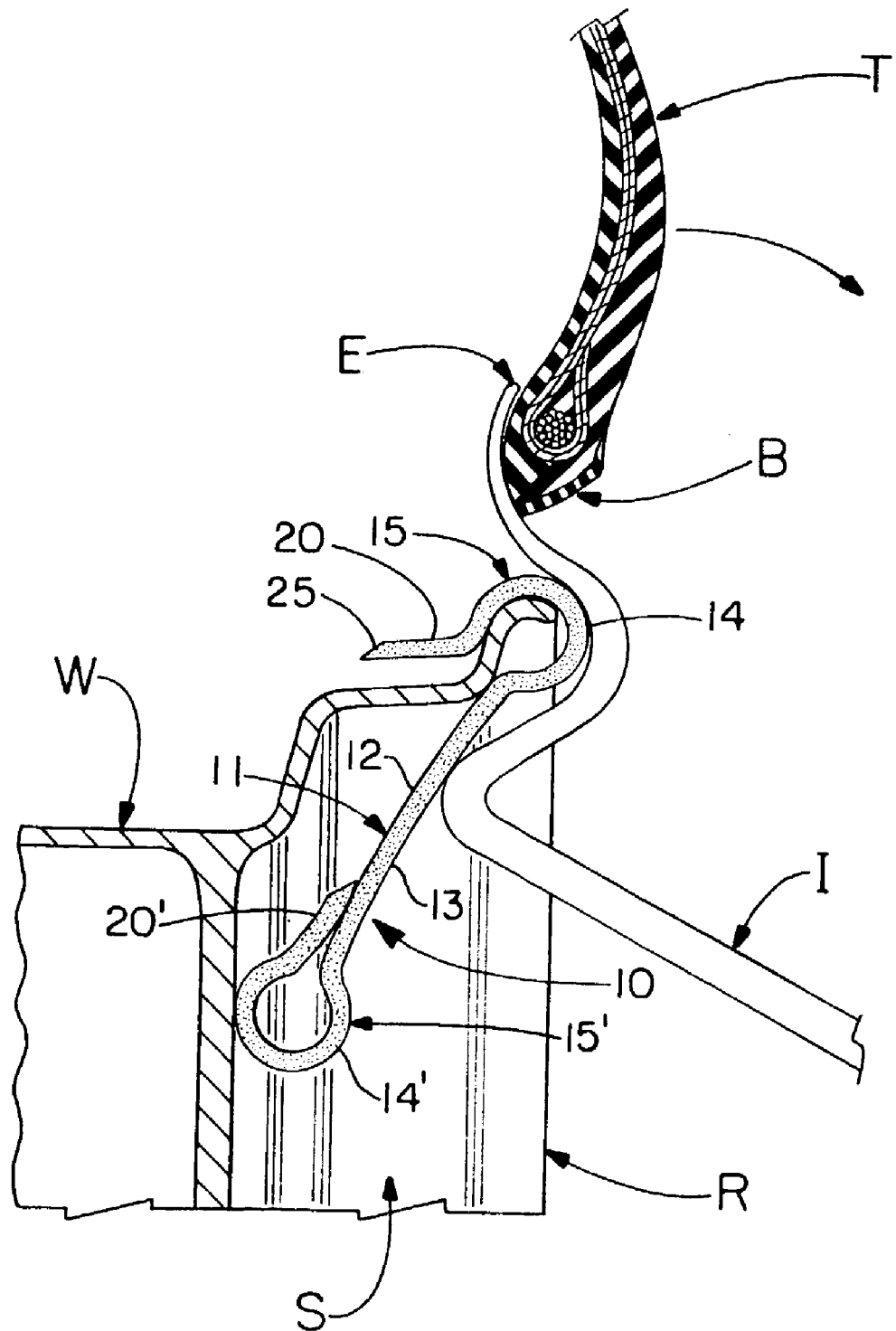
FIG. 6 is a fragmental partially sectioned side elevational view of a wheel and a tire similar to FIG. 5 depicting a protecting pad according to the concepts of the present invention located on a rim of the wheel during the removal of the tire by tire-working implement.

The body 11 may cover a portion, such as the well surface S, of the wheel W such that the tire working implement I may bear against the pad 10 as opposed to the surfaces of the wheel. The body 11 may be a substantially planar member having an inner surface 12 and an outer surface 13. As shown in FIG. 5, during use of the pad 10, the inner surface 12 may be located against the rim R with the outer surface 13 facing the bead removing implement I. In these circumstances, the tire working implement I may be inserted between the outer surface 13 and the bead B. The body 11 may have any length and may extend over the rim R or to a greater extent to cover at least a portion of the surface S of the wheel well (FIG. 6). As depicted in FIG. 5, some implements have specially contoured ends that cause the implement I to contact multiple portions of the wheel W including, for example, the rim R and well surface S. Body 11 may provide for such contact by extending to at least the point where the implement I ordinarily would contact the wheel W.

The attachment assembly 15 is adapted to support the pad 10 at a selected position, such that the pad 10 may be fit to rim R before using a tire working implement I that might otherwise damage or mar the wheel W. Generally, attachment assembly 15 is adapted to grasp or otherwise fit over the rim R and may include, as shown, a foldover 14 that is attached to or extends from the body 11 at a first crease 16. As shown, the foldover 14 may be arcuate and generally form a somewhat cylindrical body that defines an open bore 18 in which an edge of the rim R resides during use of pad 10. It will be appreciated, however, that the shape of the foldover 14 is essentially arbitrary with the limitation that it suitably fit over the rim R. Thus, any number of foldover shapes or profiles may be used in accordance with the concepts of the present invention.

To provide reliable securement of the pad 10, the attachment assembly 15 may further include a second crease 17 that further acts to hold the pad 10 on the rim R. To grip the rim R between the creases 16, 17, the creases 16, 17 may be opposed and/or extend inward of the bore 18 to neck the open end of bore 18. The creases 16, 17 may be spaced longitudinally or, as shown, be aligned in a common plane.

To protect the wheel W or further aid in securing the pad 10, a flange, generally indicated by the numeral 20, may be attached to or extend integrally from the foldover 14. For sake of simplicity, reference to the flange 20 or other pad component being "attached" will be understood to include integrally forming that component, as well. The flange 20 may include a generally planar member 21 that faces the body 11 to define an opening 22 into which the rim R is inserted. As shown in the figures, the body 11 and flange 20 may oppose each other and further may be formed such that the flange 20 extends substantially parallel to the body 11. To provide for an interference type fit or otherwise increase the pad's ability to grip the rim R, the flange 20 and body 11 may be closely arranged relative to each, for example, the opening 22 may be thinner than the thickness 23 of rim R.

Figure 1:
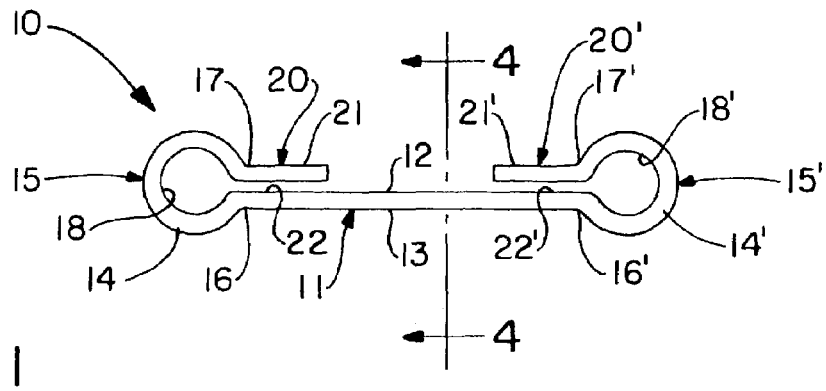
FIG. 1 is a front elevational view of a protecting pad according to the concepts of the present invention having a first attachment assembly at one end and an optionally formed second attachment assembly at an opposite end, where the optional second attachment assembly is formed symmetrically relative to the first attachment assembly.

As an alternative means of facilitating a good grip between the pad 10 and the object to be protected, for example, wheel W, the pad 10 may be constructed so as to impart a tension or other force at foldover 14, such that the flange 20 is biased or urged toward the rim R. For example, the attachment assembly may be formed to have a resting configuration, such as the configuration shown in FIG. 1, where the flange 20 has not yet been stretched over the rim R. When the attachment assembly is stretched, as shown in FIG. 5, the shape memory of the material may be used to generate a force that urges the attachment assembly 15 back toward the resting position (FIG. 1). As will be appreciated, since the rim R may prevent the attachment assembly 15 from returning to the resting position, this force is maintained and acts to grip the rim R. To facilitate slipping the pad 10 between the tire T and a wheel rim R, the flange 20 and/or body 11 may be provided with a beveled edge 25 (FIG. 5).

While the pad 10, depicted in the drawings, is shown as being generally flat across its width, it will be appreciated that the pad 10 may be curved or otherwise contoured across its width to help the pad 10 conform to the contour of the rim R. Similar contouring may be applied across the length of the pad 10, as well. Given that the pad 10 may be made of a flexible material, the rim R may cause the pad 10 to bend or otherwise conform to its shape, as shown in FIG. 6.

In selecting materials for the construction of the protecting pad 10, any suitable material known in the art may be used including but not limited to leather, woven textiles, knitted textiles, corrugated paper or cardboard, and polymers. The pad 10 may be made of flexible resilient forms of such materials, and may further be made soft such that it provides a cushioning effect. Also, elastic forms of the above materials may be selected to provide extended life and shape memory properties.

As shown, the pad 10 may be constructed from a sheet of such material with the attachment assembly 15 being formed into the sheet, as by molding, folding, or any other suitable sheet forming process. It will be appreciated that use of the terms planar and parallel in reference to the portions of pad 10 are not used strictly inasmuch as the material may be flexible and thus will not form idealized planes. For example, the large planar portion of the body 11 may have some bowing or other irregularity but otherwise maintain a generally planar configuration. In terms of relative material area, the foldover 14 and flange 20 may encompass a minor portion of the total area of the sheet of the material making up the pad 10 in the relation to body 11. For example, this "minor portion" may include less than half of the area of the sheet, for example, about 1–49%, about 5–45%, about 10–40%, or about 15–35% of the area of the sheet. When using multiple attachment assemblies, for example, assemblies 15' and 15", this relative proportion between the attachment assemblies 15, 15', 15" and body 11 may be maintained.

By providing additional attachment assemblies 15, the useful life of the pad 10 may be extended. For example, when one end of the pad 10 or its associated attachment assembly 15 wears out, as may happen over several hundred uses, the opposite end may be provided with an additional attachment assembly, such a second attachment assembly 15' or alternative second attachment assembly 15", to allow continued use of the pad 10 in with another portion thereof.

Figure 1A:
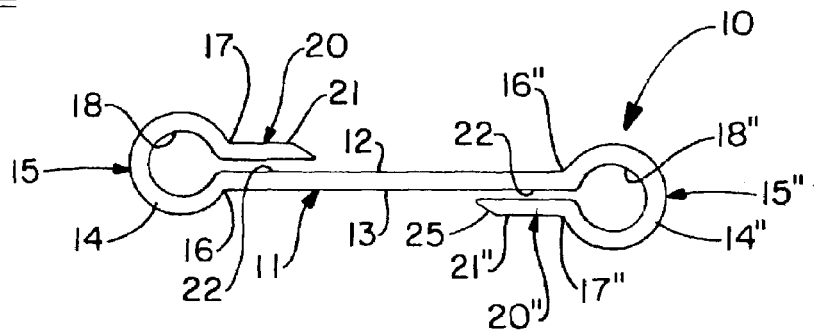
FIG. 1A is a front elevational view similar to FIG. 1, depicting an alternative arrangement of the second attachment assembly, where the second attachment assembly is formed on the opposite side of the pad.
Figure 2:
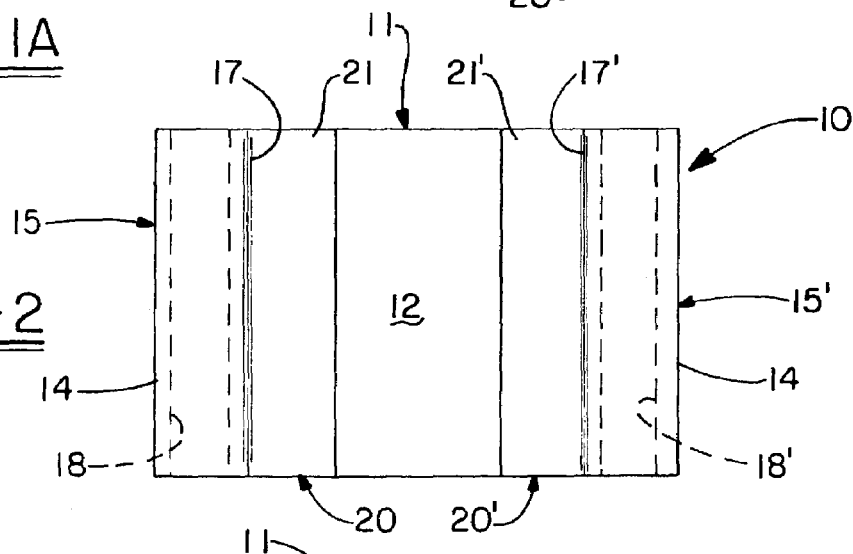
FIG. 2 is a top plan view of the protecting pad depicted in FIG. 1.

Since second attachment assemblies 15' and 15" generally may have the same components as attachment assembly 15, like numerals have been used to designate like components with a single prime accompanying the first additional attachment assembly 15' shown in FIG. 1, and a double-prime indicator used in connection with the components of the second additional attachment assembly 15" depicted in FIG. 1A. As shown, these assemblies 15', 15" may be configured in a substantially identical fashion to first attachment assembly 15 or may be modified, as desired, for example, to facilitate use of the pad 10 with multiple articles. For example, it will be appreciated that the variations in such components discussed in reference to first attachment assembly 15 may be made irrespective of the particular configuration of the first attachment assembly 15. Further, as illustrated in FIGS. 1 and 1A the additional attachment assemblies 15' and 15" may have different orientations relative to the first attachment assembly 15. For example, the second attachment assembly 15', shown in FIG. 1, may be formed such that its flange 20' is located on the same side as flange 20. Alternatively as depicted in the alternative second attachment assembly 15" of FIG. 1A, a flange 20" may be located on the opposite side of body 11 relative to flange 20. Due to this configuration, the alternative second attachment assembly 15", shown in FIG. 1A, is attached to or extends from a body 11 and may form a first crease 16" on the surface opposite first crease 16. Similarly, the second crease 17" is formed on the opposite side of body 11 relative to second crease 17 of first attachment assembly 15.

Figure 3:
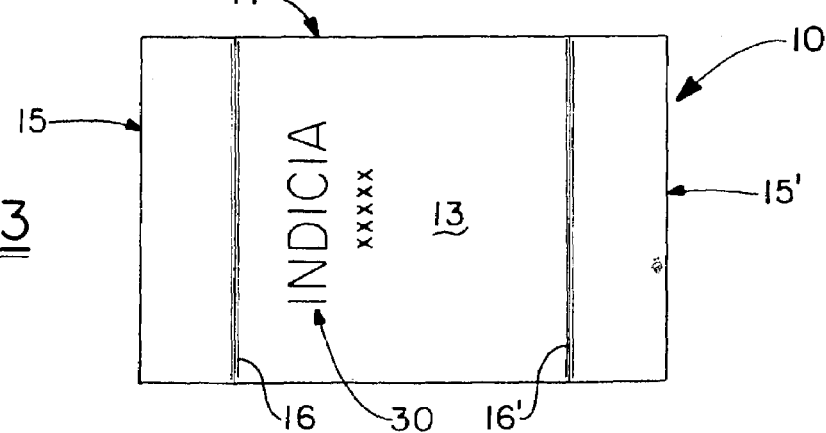
FIG. 3 is a bottom plan view of the protecting pad depicted in FIG. 1.
Figure 4:
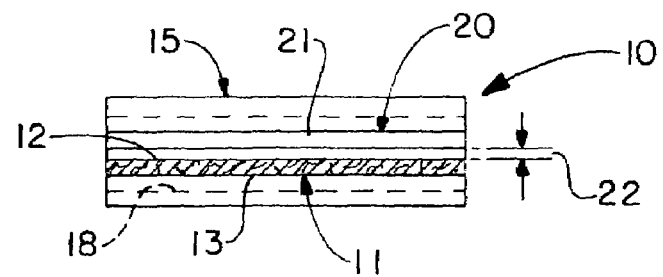
FIG. 4 is a sectional side elevational view as might be seen along lines 4—4 in FIG. 1 depicting further details of the first attachment assembly.

With reference to FIG. 3, in accordance with another aspect of the present invention, the surface of pad 10 may be provided with indicia, generally indicated at 30. The indicia 30 may be applied to the relatively large surfaces 12, 13 of body 11 as depicted, for example, in FIG. 3. It will be appreciated that various indicia 30 may be used including for example, a manufacturer's part number, a trade name, or instructions for use of the pad 10 and/or implement I.

In operation, the user would place the pad 10 on the rim R at a desired location, where the implement I would be used (FIGS. 5 and 6). To secure the pad 10 to the rim R, the attachment assembly 15 may be slid on to, stretched, or otherwise hung over the end of the rim R such that the rim R carries the pad 10. Rim R may be graspingly received within the attachment assembly 15 as described above. As indicated previously, the small clearance 22 between the flange 20 and the body 11 of the pad 10 may facilitate grasping engagement of the rim R causing the body 11 to contact the rim R on it's outer face a first face F1 and the flange 20 to contact the inner face of the rim R. Since the flange 20 may provide suitable area for use of the implement I, the inner and outer faces of rim R are somewhat arbitrary in that the user may invert the pad 10 from the configuration shown in FIG. 5. According to another aspect of the invention, the foldover 14 of attachment assembly 15 may be pre-tensioned such that it urges the flange 20 into contact with the inner face to better grasp the rim R.

With the pad 10 in place, the implement I may be inserted between the bead B of the tire T and the rim R of wheel W with the tool end, generally indicated by the letter E bearing against the pad 10, which overlies the rim R. The implement I may then be operated in a manner known to those of ordinary skill to remove the bead from the rim R. In some instances, to remove the bead B from the rim R, the implement I must be rotated around the edge of the rim R to cause the end E of the implement I to lift the bead B over the rim R, as shown for example in FIG. 6. In these instances, a portion of the implement I, such as its heel, may contact the finished surface of the rim R for the well surface S of the wheel W. With the pad 10 overlaying at least a portion of well surface S corresponding to the point of contact P, where the implement I would ordinarily contact the wheel W, the pad protects the wheel W from any deformation or marring that the implement I might otherwise cause.

Since it is often necessary to successively remove the bead B at a number of radial positions, the user may remove the pad 10 and reattach it at a different radial position in a successive fashion, thereby protecting the wheel W as the bead B is progressively removed. After the bead removal operation is complete, the pad 10 may be released from the rim R, as by stretching the body 11 and flange 20 away from each other (FIG. 5) to open the creases 16, 17 sufficiently to pull the pad 10 away from the rim R. As previously discussed, if the one end of the pad 10 becomes sufficiently worn that it is no longer of use, a second end may be provided with an additional attachment assembly 15' or 15" that allows continued use of the pad 10 by merely attaching the pad 10 at the second attachment assembly 15', 15". While the second attachment assembly is shown at the opposite end relative to first attachment assembly 15, it will be appreciated that the second attachment assembly may be located at other positions on the pad 10 and, if desirable, the pad 10 may be provided with more than two attachment assemblies to further extend its use.

Based upon the foregoing disclosure, it should now be apparent that the pad and the method as described herein will carry out the objects of the present invention. It is, therefore, to be understood that any variations evident fall within the scope of the claimed invention and thus, the selection of specific component elements or exercises can be determined without departing from the spirit of the invention herein disclosed and described. Thus, the scope of the invention shall include all modifications and variations that may fall within the scope of the attached claims.

What is claimed is:

1. A wheel protecting pad for protecting a rim and a wheel well of a wheel while mounting or demounting a tire with a tire mounting or tire demounting implement, the pad comprising:
   a body;
   an attachment assembly including a foldover, a first crease and a second crease, said foldover defining an open bore adapted to receive the rim, wherein said body is attached to said attachment assembly to extend from the first crease to cover at least a portion of the wheel well; and
   a flange attached to said attachment assembly opposite said body.

2. The wheel protecting pad of claim 1, wherein said first crease and said second crease oppose one another.

3. The wheel protecting pad of claim 2, wherein said first crease and said second crease are aligned with each other in a common plane.

4. The wheel protecting pad of claim 1, wherein said attachment assembly is spaced from said body to receive the rim.

5. The wheel protecting pad of claim 1, wherein the flange is inserted between the tire and the rim, and wherein said first crease is located between said body and said foldover, and said second crease is located between said foldover and said flange.

6. The wheel protecting pad of claim 1, wherein said body and said flange extend substantially parallel to each other.

7. The wheel protecting pad of claim 1, wherein said foldover is adapted to urge said flange toward a configuration substantially parallel to and opposing said body.

8. The wheel protecting pad of claim 1 further comprising indicia carried on a surface of the pad.

9. The wheel protecting pad of claim 1, wherein said flange has a beveled edge.

10. The wheel protecting pad of claim 1, wherein the pad is made of a sheet of material selected from the group consisting of leather, knitted textiles, woven textiles, corrugated paper and polymers.

11. The wheel protecting pad of clam 1, wherein the pad is made of leather.

12. The wheel protecting pad of claim 1, wherein said body has opposed ends and wherein the pad further comprises: a second attachment assembly attached to said body at an end of said body opposite said attachment assembly, and wherein said second attachment assembly includes a foldover.

13. The wheel protecting pad of claim 12 further comprising a second flange attached to said second attachment assembly, wherein said second flange and said body oppose one another.

14. The wheel protecting pad of claim 13, wherein said flanges are located adjacent a single surface of said body.

15. The wheel protecting pad of claim 13, wherein said second flange is located on an opposite side of said body relative to said flange.

16. A wheel protecting pad for protecting a wheel rim and wheel well from a tire implement while mounting or demounting a tire to or from a wheel, the pad comprising: a flange insertable between the tire and the wheel; an attachment assembly attached to said flange; and a body attached to said attachment assembly opposite said flange, wherein said flange is made of a soft flexible resilient material, said attachment assembly is adapted to grip the rim of the wheel, thereby providing a barrier between the wheel and the tire implement, and said body extends over a portion of the wheel well to protect the wheel well.

17. A wheel protecting pad for protecting a wheel during mounting or demounting of a tire from the wheel, the pad comprising a piece of leather having a body, at least one attachment assembly, and at least one flange, wherein a respective flange is attached to said body through a respective attachment assembly, and whereby said body and said at least one flange are substantially planar, said attachment assembly being adapted to urge said flange toward a configuration substantially parallel to said body.

* * * * *